March 7, 1967 C. B. ANDREASEN 3,307,542
LUNG VENTILATING EQUIPMENT
Original Filed Feb. 5, 1963 6 Sheets-Sheet 1
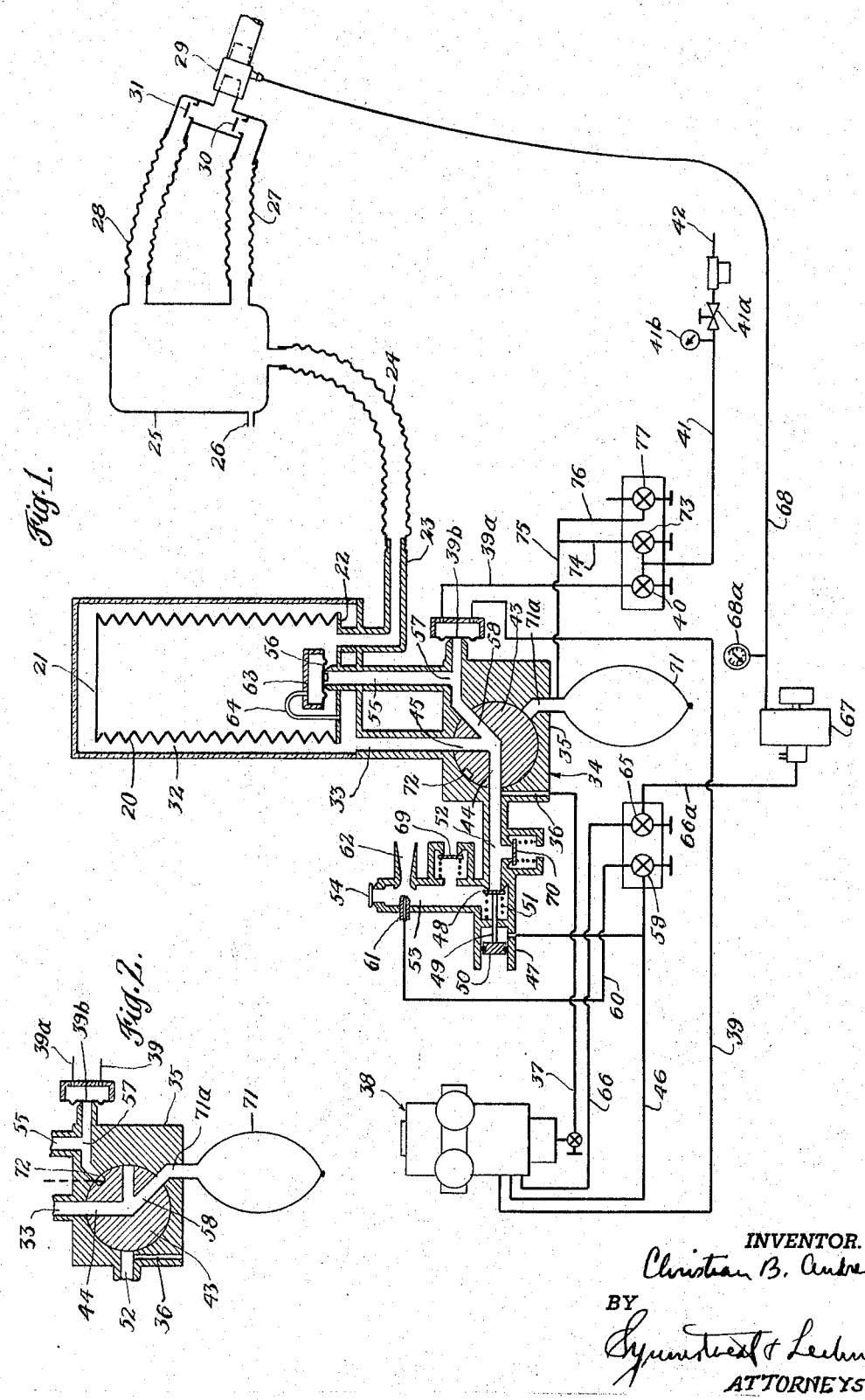
INVENTOR.
Christian B. Andreasen
BY
Synnestvedt & Lechner
ATTORNEYS

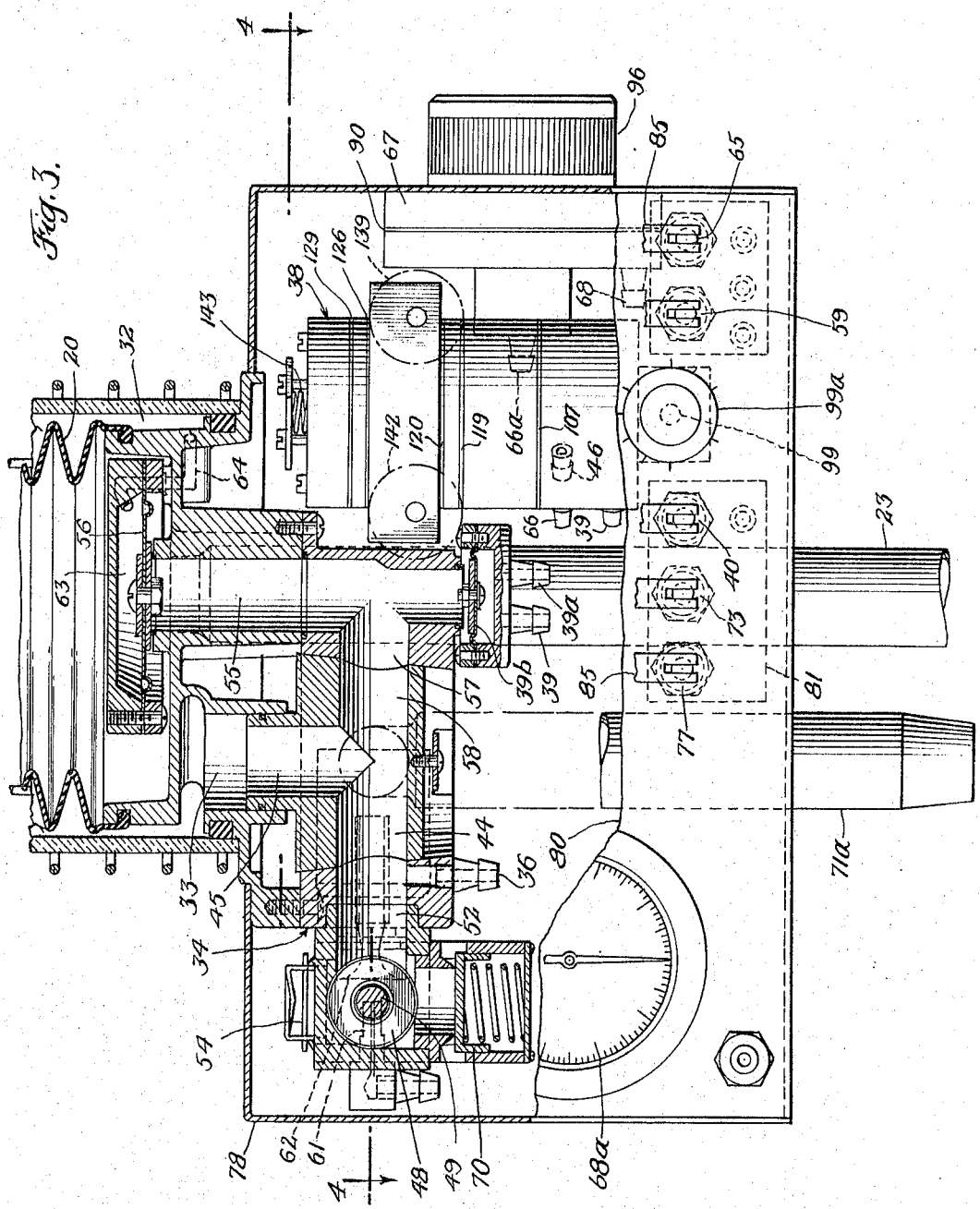

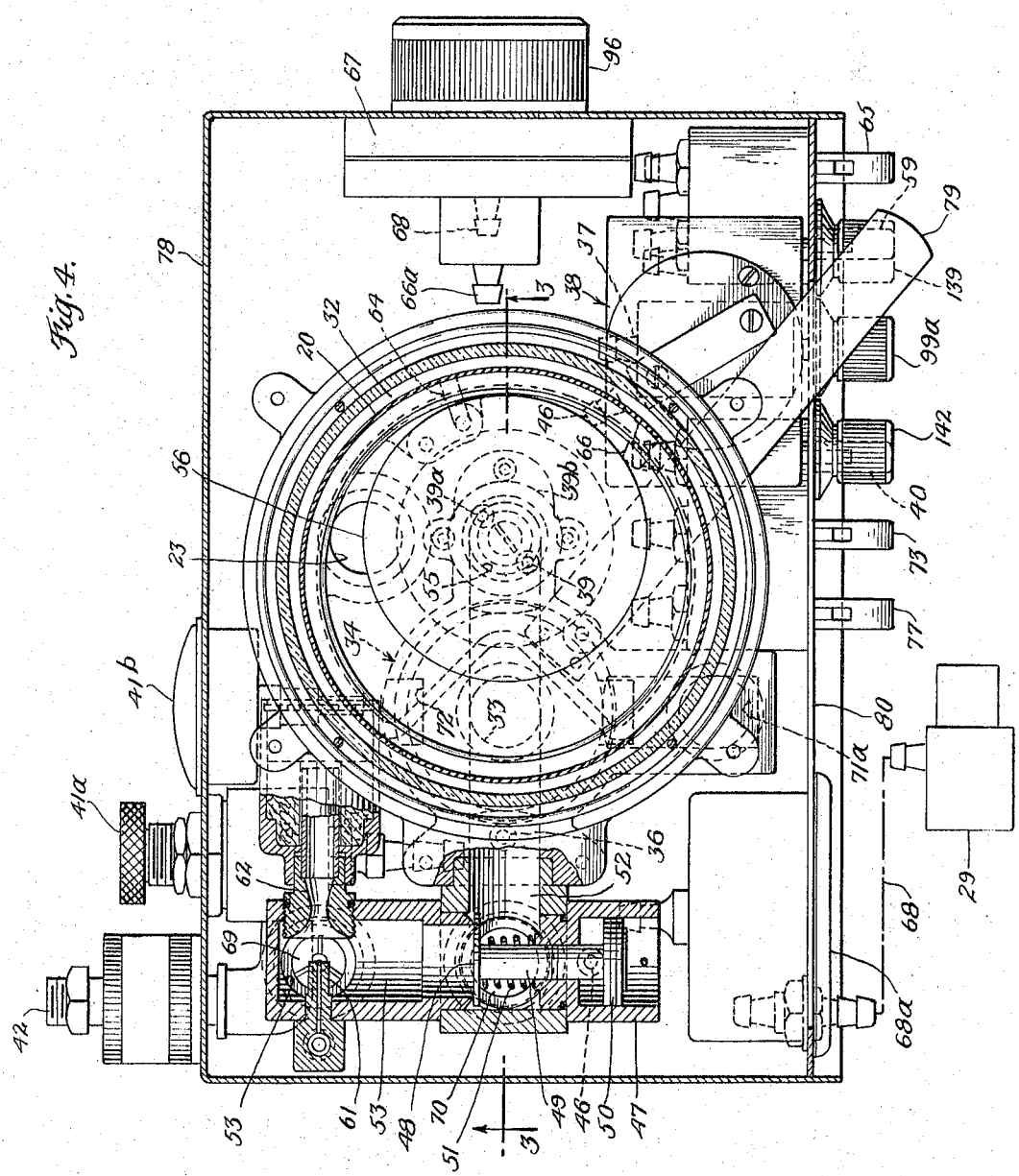

INVENTOR.
Christian B. Andreasen
BY
ATTORNEYS

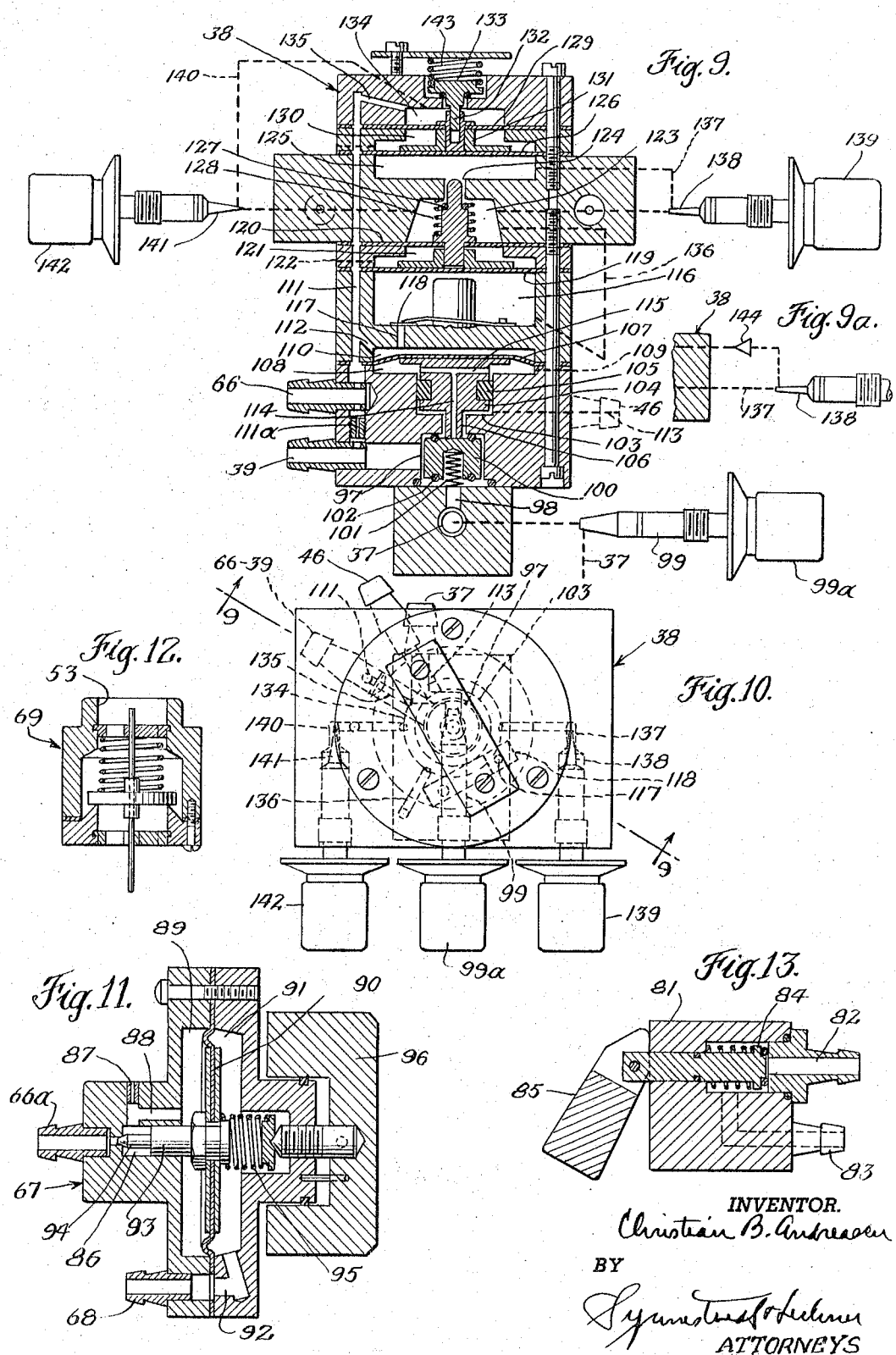

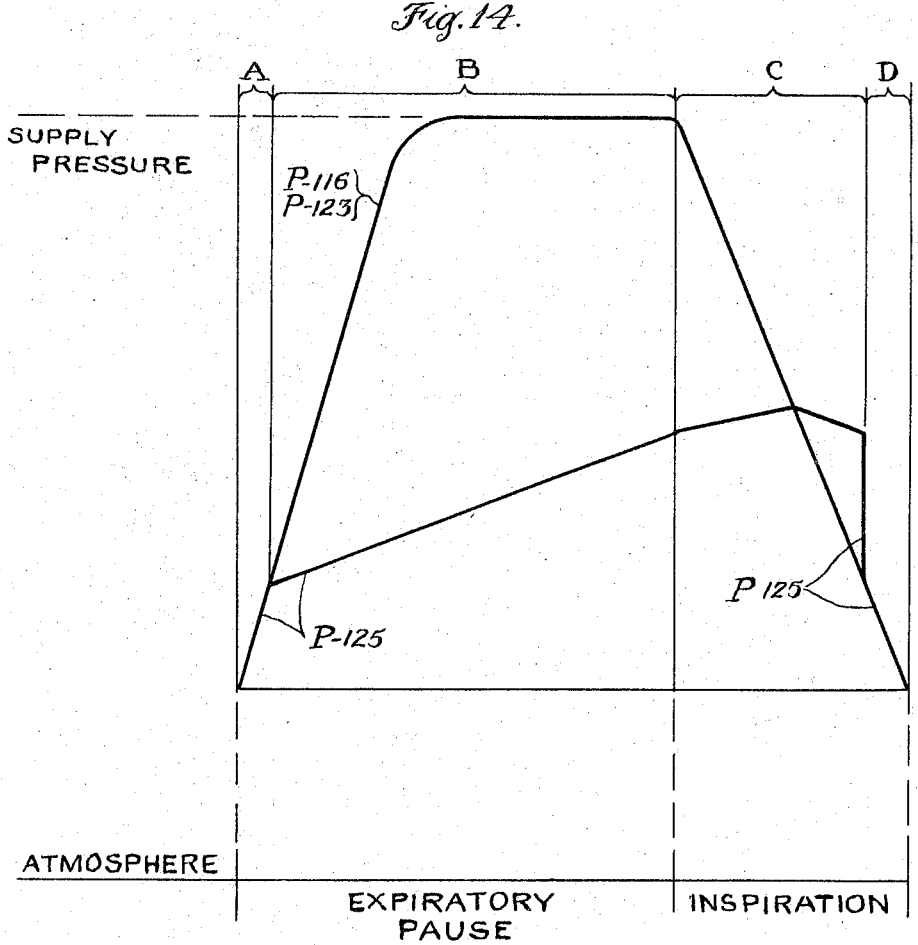

3,307,542
Patented Mar. 7, 1967

3,307,542
LUNG VENTILATING EQUIPMENT
Christian B. Andreasen, New Hope, Pa., assignor to Air-Shields, Inc., Hatboro, Pa., a corporation of Delaware
Continuation of application Ser. No. 256,277, Feb. 5, 1963. This application June 4, 1965, Ser. No. 470,263
10 Claims. (Cl. 128—145.8)

The present application is a continuation of my application Serial No. 256,277, filed February 5, 1963, and now abandoned.

This invention relates to lung ventilating equipment and is concerned with equipment or apparatus adapted alternatively for several different modes of operation. Thus the equipment is adapted to provide for automatically controlled ventilating or breathing of an apneic patient. Alternatively the equipment may be used in an "assistor" mode of operation in which the equipment responds to inspiratory effort by the patient to deliver the desired gases to the patient's lungs. Still further the equipment is adapted to be manually operated, as by means of a collapsible bag of the kind commonly employed in anesthesia apparatus, so as to manually deliver the desired gases to the patient's lungs.

Certain of the objects and advantages of the invention are related to the arrangements provided according to the invention for integrating into a single apparatus various devices and controls adapted to provide for the alternative operation of the equipment according to any of the capable modes of operation. The invention provides for integration of the various devices and controls while at the same time providing certain safety features not afforded in prior known equipment.

Additional objects of the invention include the achievement of a number of improvements, as mentioned herebelow with reference to specific functions of the apparatus while retaining the capability of alternative modes of operation. Among such objects and advantages are the following:

In considering certain of these objects it is first mentioned that in apparatus according to a preferred embodiment of the invention, a collapsible reservoir or bellows is provided, the interior thereof being in communication with the patient's lungs, so that the bellows expands and collapses with the patient's expiration and inspiration. The bellows is arranged within a chamber having a transparent wall, so that the bellows may be observed and may be utilized as a monitoring or metering device by which the operator may at all times observe and gauge the extent and character of the patient's breathing.

In a system of the kind above mentioned, it is an object of the present invention to provide for the alternative connection of a manually operable bag, or of automatically controlled pressure means, to the pressure chamber surrounding the bellows, so that whether the equipment is automatically or manually operated to assist or control the breathing of a patient, the operator may always be apprised of the extent and character of the patient's breathing by observation of the bellows in the wall of the chamber.

It is a further object, in equipment of the kind generally referred to above, to provide a safety dump valve associated with the pressure system which is connected to the interior of the pressure chamber and by which, in the event of failure or shut-off of the supply pressure to the apparatus, the pressure in the chamber surrounding the bellows will be vented to atmosphere, so as not to impair or endanger the patient's expiration.

Another object of the invention is to provide a patient responsive device for triggering or initiating the inspiration action of the apparatus, which device is highly sensitive in responding to even very weak inspiratory effort by the patient. In accordance with this aspect of the invention, the patient responsive device comprises an amplifier by which even a very slight reduction in pressure incident to a very weak inspiratory effort by the patient is multiplied so as to be effective and quick acting in intiating the inspiratory phase of the cycle of operation of the apparatus.

The exceptional sensitivity above referred to is achieved according to the invention by the employment of a pneumatic control connection associated with the mouthpiece or other duct adapted to be associated with the patient, so that the controlling pressure signal is derived at a point closely adjacent to the patient's lungs. In this connection it is noted that in apparatus of the kind here under consideration, the patient's mouthpiece is commonly connected with two flexible tubes, one for the inspiratory gases and the other for the expiratory gases. According to the invention, it is preferred to locate the usual inspiratory and expiratory check valves close to the duct or other device adapted to be associated with the patient and further to connect the pneumatic control connection with said device or duct on the patient's side of the check valve. In this way fluctuations in pressure in the system on the patient's side of the check valves are isolated from the control connection and thus do not influence the control connection. In consequence of this it is possible to employ a much more sensitive trip mechanism, thereby making practical tripping of the power mechanism to initiate inspiration by much weaker inspiratory effort by the patient than has been practicable heretofore. The foregoing system also has the advantage of eliminating undesired tripping of the control mechanism by minor fluctuations in pressure in portions of the system such as the corrugated flexible tubes.

It is another object of the invention to provide for alternative operation in the automatic mode with either atmospheric or negative pressure present in the chamber surrounding the bellows during the expiratory phase. In this way the automatic equipment may if desired (by establishing the negative pressure condition during expiration) assist not only the inspiration of the patient but also the expiration of the patient.

Still another and important object of the invention relates to the action of the automatic controller or timing mechanism provided according to the present invention, and especially when the equipment is being employed to assist inspiratory effort on the part of the patient. In certain prior devices intended to provide for initiation of the inspiration phase as a result of the patient's inspiratory effort, the lentgh or time of the inspiratory action of the apparatus will decrease from a normal value such as that established by the fully automatic action of the apparatus, depending upon the point in the expiratory phase at which the patient manifests an inspiratory effort. Indeed with certain prior forms of equipment, if the inspiratory effort on the part of the patient occurs at a point close to the start of the automatically established expiratory phase, the inspiratory action set-up thereby is of only very slight duration, not fully adequate for proper lung ventilation in that cycle of operation. According to the present invention, the automatic control mechanism is arranged so that the inspiratory action of the apparatus, as triggered by an inspiratory effort by the patient, is not appreciably different in duration, regardless of the point in the expiratory phase when the patient's inspiratory effort occurs.

How the foregoing and other objects and advantages of the invention are obtained will appear more fully from the following description of the accompanying drawings which illustrate a preferred embodiment of the invention and in which:

FIGURE 1 is a schematic view illustrating the embodiment in a manner diagrammatically representing the various devices and connections, so that the flow pattern in various modes of operation may readily be understood;

FIGURE 2 is a fragmentary view of a portion of the equipment shown in FIGURE 1 but with the main control valve in a different position;

FIGURE 3 is a sectional elevational view of the principal portions of the equipment as shown in FIGURE 1, the sectional portion of this view being taken as indicated by the section line 3—3 on FIGURE 4;

FIGURE 4 is a plan view of the parts shown in FIGURE 3, with many parts in horizontal section as taken on the line 4—4 of FIGURE 3;

FIGURE 9 is a vertical sectional view through the controller or timer taken approximately on the line 9—9 of FIGURE 10 and with certain passages and parts schematically indicated;

FIGURE 9a is a view of certain control parts of an arrangement such as shown in FIGURE 9 but showing a minor modification;

FIGURE 10 is a plan view of the controller or timer shown in FIGURE 9;

FIGURE 11 is a sectional view through a control device responsive to inspiration by the patient in order to trigger the operation of the controller shown in FIGURES 9 and 10;

FIGURE 12 is a sectional view through another one of the valves employed in the system;

FIGURE 13 is a sectional view through one of the toggle-actuated valves employed; and FIGURES 14 and 15 are diagrams illustrating certain phases of the operation of the controller for the equipment.

Figure 5:
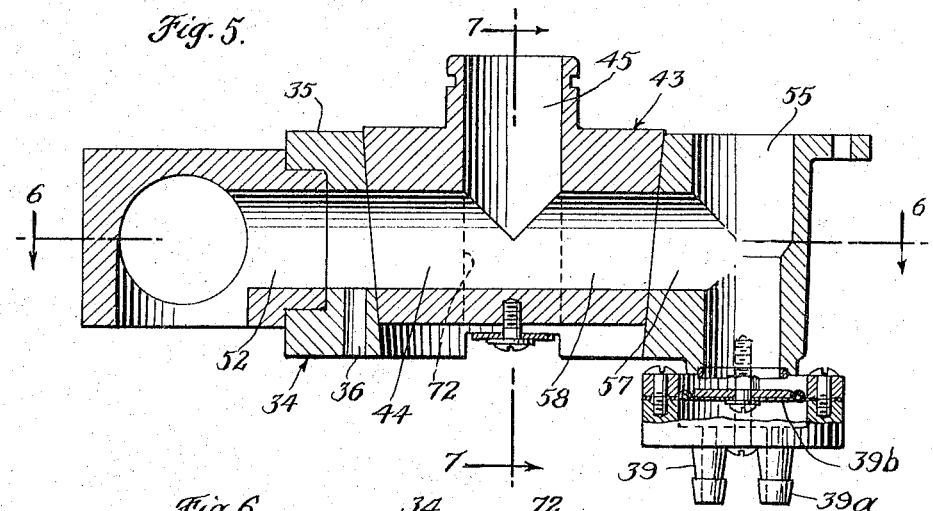
FIGURE 5 is an enlarged vertical sectional view through the main controlling valve of the apparatus and of certain associated parts, taken as indicated by the section line 5—5 on FIGURE 6.

In the following description the arrangement of the invention is first considered with relation to the schematic illustration of FIGURE 1.

In accordance with the invention, the system for handling the inspiratory and expiratory gases includes a collapsible reservoir, desirably in the form of a bellows 20 which is closed at the top as indicated at 21 and at the bottom at 22, the bottom having certain ports and passages associated therewith, as will be described. A duct 23, together with a flexible corrugated tube 24 serves to connect the interior of the bellows 20 with the gas supply and absorber unit 25. This unit is provided with an inlet 26 into which the gases to be delivered to the patient are introduced, for instance air or oxygen and, when the apparatus is used for purpose of anesthesia, the anesthetic gases would also be introduced through the inlet 26, usually in admixture with at least some oxygen. From the absorber 25, which may be of any well-known type, inspiratory and expiratory connections, desirably in he form of corrugated tubes 27 and 28 extend for attachment to the duct or fitting 29 which is adapted to be associated with the patient, either by means of a mouthpiece, mask, or a tube for attachment to the trachea. Between the duct 29 and the tubes 27 and 28 there are check valves 30 and 31, and thereby the expiratory gases are constrained to flow through tube 28 and the inspiratory gases through tube 27.

The bellows 20 is adapted to be actuated by power means operating to collapse the bellows and thereby deliver gases through the system associated with the patient into the patient's lungs. For this purpose the bellows 20 is surrounded by a chamber 32, preferably formed by a transparent chamber wall, into which gas such as air under pressure may be introduced in order to effect collapse of the bellows. Air for this purpose is supplied to the chamber through a duct or passage 33 which is connected with a valve generally indicated at 34. This valve comprises a valve casing 35 having various ports therein, one of which communicates with passage 33 as will be seen. Another such port communicates with the air supply passage 36 which is connected by means of a pipe diagrammatically indicated by 37 with a controller device generally indicated by numeral 38. The controller 38 is supplied with fluid under pressure, for instance compressed air, from the source 42 through pipe 41 and through the supply line 39–39a which is controlled by a shut-off valve 40. The supply is provided with a regulator valve 41a. The supply line 39–39a is associated with a safety dump valve 39b which is normally closed during all normal operation of the system but which is provided for certain purposes later to be described.

Under certain timed controls later to be described, the air under pressure flows from the source 42 through the controller 38 and thence through pipe 37 and passage 36 to the control valve 34. Within the casing 35 of the valve 34 is a rotatable plug valve part 43 having passages therein including passages 44 and 45, which with the valve in the position indicated in FIGURE 1, connect the passageway 36 with the duct 33, thus providing for the supply of air under pressure to the chamber 32 surrounding the bellows 20. This action is utilized to collapse the bellows and thereby deliver the inspiratory gases to the patient.

For the expiratory phase of the operation the controller 38 shuts off the supply of air under pressure to the pipe 37 and thus to the chamber 32 and delivers air under pressure through the pipe diagrammatically indicated at 46 to the operating cylinder 47 of a dump valve comprising a valve part 48 mounted on a stem 49 and adapted to be operated by the piston 50 working in the cylinder 47. A spring 51 normally urges the dump valve to its closed position. As will be seen in FIGURE 1, the dump valve, when closed, blocks the duct 52 which communicates through a port in the valve casing 35 with the passageway 36 and also with the port 44 in the valve itself. When the valve 48 is open, the duct 52 is connected with duct 53 having an expiration or exhalation valve 54 in the form of a readily openable flap valve.

During the expiratory phase, when the controller has actuated the dump valve 48 to retain it in its open position, the expiration of the patient causes the bellows 20 to expand and this in turn expels air from the surrounding chamber 32, which air is discharged past the valve 48 and delivered to atmosphere through the exhalation valve 54.

In the normal operation of equipment of this type, additional gases are customarily being introduced through the inlet 26 into the system associated with the patient's lungs, so that in the absence of overflow, an excess of gas would customarily build up in the system. Overflow means are provided as follows: A duct 55 extends upwardly through the lower end of the chamber 32 surrounding the bellows 20 and provides at its upper end, within the bellows space, a valve seat with which the diaphragm valve 56 is associated. When the valve 56 is lifted from the seat, gases may flow from the interior of the bellows into the duct 55 and thence downwardly to a passage 57 in the valve housing 35 communicating with the passage 58 in the valve member 43 which joins the passages 44 and 45 and thus also communicates with the duct 52. This action is assured by means of a chamber 63 associated with the upper side of the valve 56, this chamber being placed in communication with the space within the chamber 32 through a balancing or equalizing passage 64. With this arrangement valve 56 operates by the difference in pressure between the internal bellows space and the surrounding chamber space.

During expiration by the patient, the bellows 20 expands until it has been fully expanded, whereupon the pressure within the bellows exceeds the external pressure and acts on the lower exposed surface of the diaphragm valve 56 and lifts the valve from its seat, to thereby provide for overflow of excess gases from the patient's system through the duct 55 and through the control valve, past the dump valve 48 for discharge to atmosphere through the exhalation valve 54.

When the controller again shifts to the inspiratory phase, the dump valve 48 is again closed and air under pressure is again supplied to the pipe 37, and therefrom through the valve 34 to the chamber 32 surrounding the bellows 20. In the above described operation, during the expiratory phase, the chamber 32 and the ducts and passages 33, 52, 53 and 55 are all at substantially atmospheric pressure, because of the opening of dump valve 48 and also because of the substantially free communication through the light flap valve 54.

According to the arrangement shown in FIGURE 1, the equipment is also adapted to operate with a negative pressure in the chamber 32 during the expiratory phase of the cycle. This is accomplished by opening a valve 59 which supplies air under pressure from the line 46 (also supplying air to the dump valve cylinder 47) to the pipe 60 which extends from the valve 59 to a nozzle 61 directed into a venturi passage 62. Thus when valve 59 is open, the controller 38, during the expiratory phase, supplies air under pressure not only to the dump valve cylinder 47 to open the dump valve 48 but also to the venturi nozzle and passage 61–62 by means of which the pressure in the ducts 53, 52 and 33 and in the chamber 32 is reduced to a value below atmospheric. In this way the negative pressure in the chamber surrounding bellows 20 assists the expiratory action of the patient.

Even when operating with a negative pressure in the chamber 32 and the associated passages it is nevertheless desirable that the system be capable of discharge or overflow of excess gases from the patient's system through the overflow valve 56. This is assured by the presence of the chamber 63 and the passage 64 above mentioned. In this way, even with a negative pressure applied to the duct 55 and thus to the lower portion of the valve 56 which is exposed through the valve seat at the top of that duct, since the upper side of the valve 56 is exposed to the same negative pressure, overflow will occur when the bellows has been expanded, just as in the case when the expiratory phase is being effected with atmospheric pressure in the chamber 32 and the associated passages.

The automatic operation of the system as described above is well adapted for use with the apneic patient either anesthetized or otherwise. However, the equipment is further adapted to be operated as an assistor with the patient who manifests inspiratory effort. This is accomplished by the opening of valve 65 which is interposed in the connection 66–66a extended from the controller 38 to the control device 67. As will be further described hereinbelow, the connection 66 is associated in the controller 38 with a pneumatic device which (by virtue of drop in pressure in the line 66) initiates the delivery of air under pressure through the line 37 when the patient manifests an inspiratory effort. The device 67 is provided with a control connection 68 which extends therefrom to the duct 29 adapted to be associated with the patient and upon inspiratory effort by the patient, the consequent reduction in pressure in the control connection 68 trips or triggers the device 67 to dump air from the line 66a and thus causes the controller 38 to deliver air under pressure through the line 37 and other passages into the chamber 32 surrounding the bellows. By virtue of association of the pneumatic control connection 68 with the duct 29 at the patient's side of the check valves 30 and 31, the pneumatic control line 68 is isolated from most of the parts of the patient's breathing system. In consequence, the control line 68 is not subject to pressure fluctuations which tend to occur in various parts of the system, for instance as a result of accordion-like oscillation of the corrugated flexible tubes which sometimes occurs from jarring or vibrations. It is therefore possible to utilize a trip mechanism 67 which is much more sensitive than has been practicable in other arrangements, and the equipment will therefore respond to exceedingly weak inspiratory effort on the part of the patient.

The invention also contemplates employment of an indicator, for instance a pressure gauge 68a associated with the pneumatic control line 68 in order to give a visual indication of the patient's inspiratory effort.

The structure and operation of the controller 38 and the device 67 are described more fully hereinafter. For safety purposes the system desirably includes both negative and positive pressure relief valves, as indicated at 69 and 70, the first of these being associated with the duct 53 with which the venturi 61–62 is also associated, and the latter of these with duct 52 which is subject to the positive pressure as supplied through passage 36.

At this point it is mentioned that while some exhaust or dumping action may occur through the venturi passage 62 even when the venturi is not in operation, nevertheless the dumping action tends to be restricted through such a venturi and for this reason the invention provides the light exhalation or dump valve 54, in order to insure freedom for the patient's expiratory action.

The valve 39b associated with the supply line 39–39a cooperates with a port and valve seat associated with the valve casing 35 and communicating with the passage 57, which in turn is connected not only with duct 55 but also with ducts 33 and 52 when the valve 43 is in the position illustrated in FIGURE 1. When pressure is present in the line 39–39a the valve 39b is closed and the system functions in the manner described above. Valve 39b is provided in order to avoid a possible situation where the equipment remained associated with a patient under conditions where pressure was not available to open dump valve 48, thereby impeding expiration by the patient. The pressure holding valve 39b to its seat is released upon any failure of the supply pressure 42 or upon closure of the supply valve 40 and in view of this, it is not possible for the patient's expiration to be interfered with even if the equipment remained associated with the patient after air supply failure.

In accordance with still another mode of operation, the valve 43 may be adjusted to the position indicated in FIGURE 2 in which the common manually operable bag 71 is connected through passages 71a, 58 and 44 with the duct 33, and the duct 52 associated with the automatic controller 38 is shut off. For inspiration of the patient, the manual operation of the bag will deliver air through the duct 33 and into the chamber 32 surrounding the bellows 20 and thereby collapse the bellows to deliver the desired gases to the patient. For expiration of the patient in this mode of operation, the overflow duct 55 is connected through passage 57 in the valve body to a passage 72, which passage communicates with atmosphere through an end of the valve body 35 as will be described hereinafter with reference to other figures. Thus free expiration by the patient and overflow of excess gases is provided for in this mode of operation, without delivering the overflow to the bag, which would cause pressure build-up in the system.

It is of importance in connection with the mode of operation employing the manually operable bag that, just as in automatic operation, the extent and character of the patient's breathing may be monitored by observation of the bellows 20 through the transparent wall of the chamber 32. This is assured by arranging the bag for connection with the chamber 32, rather than directly with the patient.

In addition, even when the valve 43 is set to provide for manual bag operation, the operator may still observe the patient's inspiratory effort by leaving valve 65 open and noting the flow of gases discharged from the controller 38 which occurs as a result of operation of the controller described hereinafter. This provides convenience in watching the inspiratory timing of the controller with that of the patient and in turn provides for a smooth transition from manual to automatic operation. Moreover, if desired, the operator may adjust the controls for the automatic cycling even while the valve 43 is in the manual or bag position.

Air or other gases may be supplied to the bag 71 from the source 42 through line 41, valve 73 and line 74–75. Gas may be discharged from the bag from lines 75 and 76 and the discharge valve 77.

Figure 6:
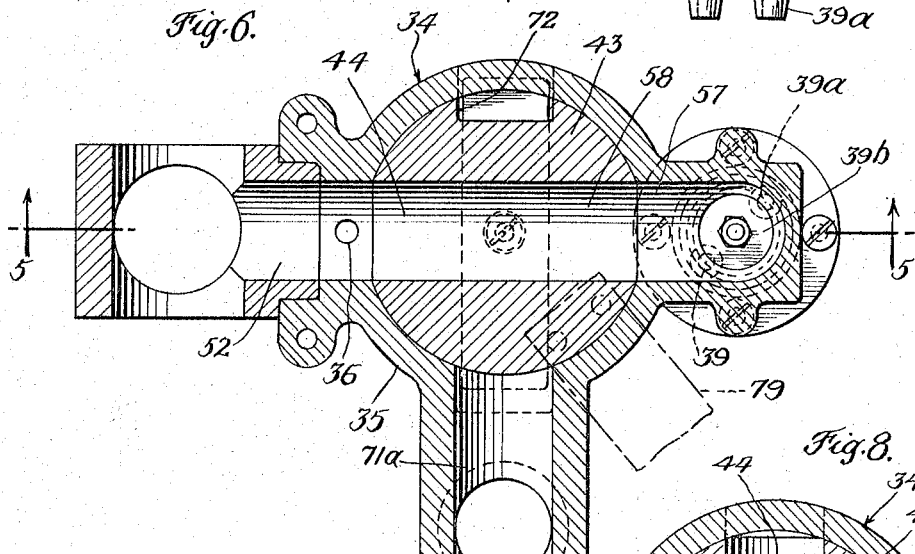
FIGURE 6 is a plan section taken on the line 6—6 of FIGURE 5.
Figure 7:
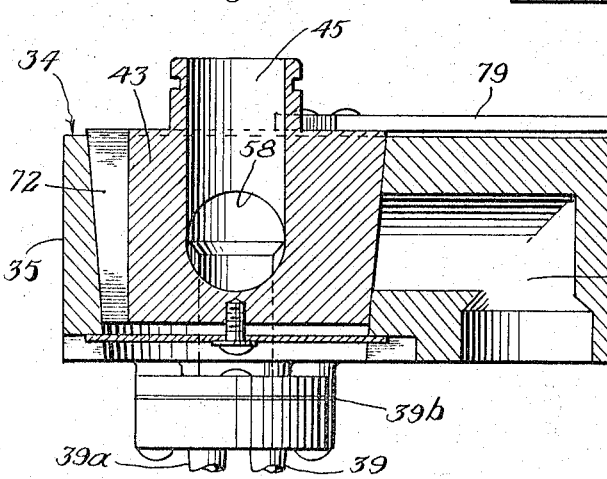
FIGURE 7 is a vertical section taken on the line 7—7 of FIGURE 5.
Figure 8:
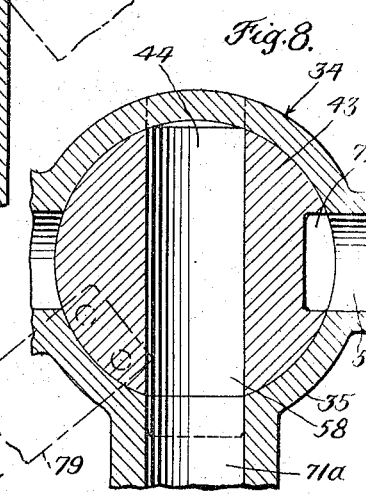
FIGURE 8 is a fragmentary view similar to FIGURE 6 but illustrating the main control valve in a different position of adjustment.

With the foregoing description of the functioning of the equipment of the invention in mind, attention is now directed to the structural embodiment of the apparatus as shown in FIGURES 3 to 13 inclusive. In these figures, the parts of the equipment illustrated comprise in general all of those parts except for the gas supply system 25 shown in FIGURE 1, and the connecting tubing and valves 24, 27, 28, 30 and 31. These latter portions of the patient's supply system may comprise conventional parts of well-known types of anesthesia apparatus. The equipment of the invention, therefore, is adapted to be used with such well-known forms of anesthesia apparatus. Indeed, the apparatus of the present invention is well adapted to mounting on a portable stand of the kind commonly used for the mounting of anesthesia equipment.

The structural arrangement of the apparatus of the invention is such as to incorporate all of the significant parts and devices within a compact unit, with the several controls conveniently arranged. Thus, various of the parts are mounted within or on a casing indicated at 78 in FIGURES 3 and 4.

The bellows 20 and the surrounding transparent wall of the chamber 32 are arranged on top of the casing 78, thereby positioning these parts for convenient monitoring or observation by the operator, as is desired for visually observing the extent and character of the patient's breathing. Within the casing just below the bellows 20 and the chamber 32 are arranged the various valve parts, passages and ducts of the valve structure 35–43 of FIGURE 1 by means of which the apparatus may be changed from manual bag operation to automatic operation. Although the structural arrangement of various of these parts is not identical with the schematic illustration of FIGURE 1, the same reference characters have been applied to FIGURES 3 and 4 and the arrangement and functioning of these parts will be readily apparent from comparison thereof with FIGURE 1. Similarly in connection with FIGURES 5 to 8 inclusive which are enlarged views illustrating the main control valve for switching between manual and automatic operation, the same reference characters have been applied and the arrangement and operation of the structural parts will be readily understood. It may here be added that the main valve member 43 is shiftably movable from the position shown in FIGURE 1 to the position shown in FIGURE 2 by means of the control handle 79 which appears in FIGURES 4, 6, 7 and 8. When this handle is moved toward the right as seen in FIGURE 4, the valve is positioned in accordance with the illustration of FIGURE 1 and when the handle is moved to the left (see FIGURE 8) the valve is positioned in accordance with FIGURE 2.

The air supply connection 42 is located at the rear of the casing 78, as appears in FIGURE 4, and adjacent thereto is arranged the air supply regulator valve 41a, by means of which the pressure admitted to operate the system may be controlled. An air pressure gauge 41b is also provided at the rear in order to indicate the pressure on which the system is being operated.

The patient responsive device 67 is arranged at one end of the casing 78, as clearly appears in both FIGURES 3 and 4. The specific structure of this unit is described hereinafter with reference to FIGURE 11.

The controller or timer 38 is located toward the front of the casing and several of the control knobs associated with that unit project through the front panel 80 of the casing as seen in FIGURES 3 and 4, these controls being arranged as described hereinafter with reference particularly to FIGURES 9 and 10.

The pressure gauge 68a for indicating the inspiratory effort of the patient and for monitoring the airway pressure is also located on the front panel 80, as is shown in FIGURES 3 and 4.

The control valves 59, 65, 40, 73 and 77 all of which appear in the schematic of FIGURE 1 are located on the front panel of the casing as appears in FIGURE 3. Each of these valves advantageously takes the form of a toggle-operated valve of the general type illustrated in FIGURE 13. Here it will be seen that the valve comprises a body 81 and, in a typical case, a pair of passages 82 and 83 with a valve member 84 for opening and closing communication between the passages 82 and 83. When the toggle-operated handle 85 is moved up the valve 84 is lifted from its seat and communication is established between the passages 82 and 83, and when the valve is down, the communication is cut off. This type of toggle valve and the location and arrangement thereof on the front panel provides maximum convenience to the operator.

In FIGURE 12 there is illustrated in section the negative pressure limiting or relief valve 69, the location of which may be noted toward the top of FIGURE 4 and also in FIGURE 1. This valve opens to atmosphere upon attainment of a predetermined negative pressure in the passage 53 under the influence of the venturi 61–62. The structural arrangement of the positive pressure relief valve 70 is similar as appears toward the left side of FIGURE 3.

Another structural arrangement will be observed from inspection of FIGURE 3, namely the downward projection and location of the duct or connector 71a which is adapted to be associated with the usual manually operable bag 71, and also the downward projection and arrangement of the duct 23 with which the flexible tube 24 is adapted to be connected (compare FIGURE 1). The duct 23 is firmly connected toward its upper end to the main casting for various of the passages and valve cavities and for this reason serves also as a mounting post for the unit.

Turning now to the device illustrated in FIGURE 11, namely the sensing device which is responsive to inspiratory effort by the patient, it will be seen that the connection 66a which extends from the controller 38 through the valve 31 (see also FIGURE 1) communicates with a chamber 86 having a port 87 communicating with atmosphere and also having a port 88 communicating with chamber 89 at one side of the flexible diaphragm. At the other side of the diaphragm is a chamber 91 communicating through passage 92 with the pneumatic control connection 68 which is extended to the duct or fitting associated with the patient's breathing apparatus. The diaphragm is connected to a plunger 93 carrying a valve 94 adapted to open and close communication between the pipe 66a and the chamber 86. The valve is urged toward its seated or closed position by means of a spring 95 which is adjustable by a knob 96 so as to vary the differential of pressures in chambers 89 and 91 required to shift the position of the valve. As seen in FIGURES 3 and 4 the adjustment knob 96 is arranged externally of the casing 78 for convenient access by the operator.

The effect of the sensing device shown in FIGURE 11 on the operation of the system will be described more fully hereinafter, but it is here noted that the action of the sensing device itself is in the nature of a pneumatic amplifier. It will be seen that the chamber 89 is normally at atmospheric pressure because of the constantly open passage 88 and port 87. When the patient manifests an inspiratory effort, the consequent reduction in pressure is communicated through the pneumatic control line 68 to the chamber 91 and this differential in pressure causes the diaphragm 90 to rise, thereby lifting the valve 94 from its seat and permitting rapid dissipation of pressure from the line 66a through the exhaust port 87. It will be noted that the exhaust port 87 is somewhat restricted. As a result, when the valve 94 first starts to open, there is a temporary surge of pressure into the space 89 which acts as a positive "feed back" to give the valve a snap action. This snap action gives a momentary "kick" to the manometer 68a, the latter being located close to the device 67.

In considering the controller or timer illustrated in FIGURES 9 and 10, it is first pointed out that in the automatic operation of the system, for purposes of effecting inspiration by the patient, pressure is built up in the chamber 32 in order to collapse the bellows 20 and thus to deliver gases to the patient's lungs. The pressure for this purpose is controlled by the timer. Specifically it is controlled by the lower portion of the timer as shown in FIGURE 9. The supply of air under pressure from the source 42 ultimately enters the timer by way of the air supply line 39 which communicates with a chamber 97 in the bottom of the timer mechanism. Chamber 97 also communicates through passage 98 with the connection 37 which, as described above in connection with FIGURE 1 extends to passage 36 in the valve structure and ultimately to the interior of the chamber 32 surrounding the bellows. A flow control valve 99 having an operating knob 99a is associated with the passages 98 and 37 and provides for setting the rate of flow in accordance with the desired action of the equipment. This control knob 99a projects at the front of the panel 80 of the structural arrangement as seen in FIGURES 3 and 4. In FIGURE 9 the valve 99 is illustrated as withdrawn and displaced to a side of the controller for convenience and clarity of illustration.

The flow from the supply pipe 39 through the chamber 97 to the delivery pipe 37 is controlled by a valve member 100 vertically movable but loosely fitted in the chamber 97, the valve being normally urged in the upward direction by the compression spring 101. The annular sealing ring 102 at the lower face of the valve 100 is adapted to seal against the bottom wall of the chamber 97 and thereby block off the flow from pipe 39 to pipe 37.

Above the chamber 97 is another chamber 103 in which is arranged a vertically movable plug 104 having a peripheral sealing ring 105 engaging the side wall of the chamber 103. At its lower side the plug 104 has a projection or stem 106 extended downwardly and loosely fitted in a passage communicating with the upper part of chamber 97 and adapted to bear against the top of valve 100 in order to push the valve downwardly against the action of spring 101. Downward movement of the plug 104 and thus of the valve 100 is effected by means of a diaphragm 107 to which the plug 104 is attached. The chamber 108 below this diaphragm is constantly open to atmosphere through the port diagrammatically indicated at 109. Therefore, the diaphragm 107, the plug 104 and the valve 100 are movable in the downward direction by virtue of a build up of pressure in chamber 110, which is provided for as follows:

In the left side wall of the controller device as illustrated in FIGURE 9 there is a vertically extending passage 111 which communicates at its lower end through a restriction 111a with the air supply line 39. Intermediate the upper and lower ends of passage 111 is a port 112 extended therefrom into the chamber 110 to supply pressure to that chamber for driving the diaphragm 107 downwardly and thus closing off the supply of air from pipe 39 to pipe 37.

Having in mind that it is desired to open the dump valve 48 during the expiratory phase of the breathing cycle (see FIGURE 1 and the description above) when the valve 100 is shifted to its lower or closed position air under pressure is supplied from the connection 39 through the chamber 97 around the stem 106 into the chamber 103 and from there through a passage 113 which communicates with connection 46. The connection 46 as shown in FIGURE 1 is extended to the operating cylinder 47 for the dump valve and thus provides for opening of that valve. When the expiratory phase of the cycle has been completed and the plug 104 again rises (under the influence of pressure conditions described below) the valve 100 also rises and closes off communication from the top of chamber 97 around the stem 106 to chamber 103. At this time the stem 106 lifts from the upper surface of valve 100 and thereby provides for venting of the air from the dump valve cylinder through the connection 46 and back into the passage 113 to chamber 103. From chamber 103 the venting takes place through the passage surrounding the stem 106 and then into the central bore 114 extended upwardly through the stem 106 and plug 104 and through the passage 115 to the chamber 108 which, as above mentioned, is vented to atmosphere at 109.

From the above it will be seen that the lower portion of the controller or timer comprises a valve mechanism serving to supply the pressure for collapsing the bellows and causing inspiration by the patient, and also serving to supply the pressure required to open the dump valve for the expiratory phase of the cycle. It will further be seen that this part of the controller is responsive to a differential in pressure between the chamber 108 (which is constantly vented to atmosphere) and the chamber 110 having a port 112 communicating with the passage 111. The upper portion of the controller serves to regulate the build-up of pressure in the chamber 110 and also the exhaust of pressure from that chamber, thus regulating both phases of the operation.

Before describing the operation of the upper portion of the controller, attention is called to the fact that the pressure delivered to pipe 46, depending upon the adjustment of the valve 59 (see FIGURE 1) may be employed not only to open the dump valve 48 but also to establish a negative pressure condition for the expiratory phase. Thus when the valve 59 is open, pressure is supplied from the pipe 46 through the pipe 60 to the venturi device 61–62 in order to provide a negative pressure in the passage 53 and thus, if desired, assist the expiratory phase of the patient's breathing.

In considering the upper or timing portion of the controller as illustrated in FIGURES 9 and 10, there is first presented herebelow a description of the parts, chambers and passages, and thereafter a description of the operation thereof.

Above the chamber 110 is a chamber 116 supplied with air under pressure from chamber 110 through port 117 having a spring pressed check valve 118 preventing flow from chamber 116 into chamber 110. The top of chamber 116 is defined by a flexible diaphragm 119 and above that diaphragm and below diaphragm 120 is a chamber 121 which is always maintained at atmospheric pressure by means of the vent port 122. Chamber 123 above the diaphragm 120 has a port 124 through its upper wall for communication with chamber 125 the upper side of which is defined by another flexible diaphragm 126. Communication between chambers 123 and 125 through port 124 is controlled by means of valve 127 which is connected to diaphragm 120 and which is normally urged downwardly so as to open port 124 by means of a spring 128. Above the diaphragm 126 is another diaphragm 129 and between those two diaphragms there is another vented space 130. The two diaphragms serve to mount a central guide structure 131 for the steam 132 of the exhaust valve 133 arranged at the top of the controller unit and serving to control exhaust of pressure from the chamber 134 which lies above the diaphragm 129.

The air supply passage 111 in the left wall of the controller unit extends all the way up to the top and is there placed in communication with the chamber 134 by the passage 135.

The passage diagrammatically indicated at 136 interconnects the chamber 116 with the chamber 123. Chamber 123 is also connected with chamber 125 through a passage diagrammatically indicated at 137. Passage 137 is provided with a restricting valve 138 which is adjustable by means of a knob 139.

Chamber 123 is still further connected with chamber 134 by means of the passage diagrammatically indicated at 140 and this passage is adapted to be restricted by a valve 141 adjustable by means of the knob 142. It will be noted that the knobs 139 and 142 are arranged in front of the control panel 80 of the unit as illustrated in FIGURES 3 and 4. These two control knobs 139 and 142 respectively regulate the time of expiration and the time of inspiration provided by the automatic operation of the equipment, the manner in which this is accomplished being explained herebelow.

The vent or exhaust valve 133 at the top of the controller is urged downwardly by the spring 143.

To consider the operation of the upper or timing portions of the controller as seen in FIGURE 9, it is first pointed out that the exhaust or vent valve 133 at the top of the mechanism is the valve which controls the build up of air in the passage 111 and the chamber 110 or the dumping of air from passage 111 and the chamber 110. Thus, the valve 133 controls the valve 100 at the bottom of the unit, the latter serving to deliver the pressure fluid for producing inspiration by the patient and also for opening of the dump valve 48 to provide for expiration by the patient.

The mechanism of the control lying between the exhaust chamber 134 at the top and the operating chamber 110 for the valve 100 constitutes mechanism for regulating the timing of the operation of the valve 133. Specifically, the pressure in chamber 125 is the controlling influence for the valve 133, and various of the other parts are provided for the purpose of regulating the rate of build-up of pressure in and bleed-off of pressure from, the chamber 125, to thereby regulate the intervals during which the valve 100 at the bottom of the unit will remain open and closed. Reduction in pressure in chamber 125 results in closing of valve 133, a delayed or slow pressure reduction providing an interval of time before valve 133 closes; and as the closure of valve 133 causes a build up in pressure in passage 111 and thus also in chamber 110, this will result in closure of valve 100, thus shutting off the air pressure which had been acting to induce inspiration by the patient. On the other hand build up of pressure in chamber 125 effects opening of valve 133, so that a timed or delayed pressure build-up will provide an interval of time before valve 133 opens; and when the valve 133 opens this will dump the air from passage 111 and from chamber 110 thereby causing valve 100 to open. The opening of valve 100 terminates the period which may be termed the "expiratory pause," during which the patient may be exhaling and during which there may also be a pause between the inspiratory and expiratory phases of the breathing.

FIGURES 14 and 15 have been presented to facilitate an understanding of the action of the air pressure in chambers 125, 116 and 123, and the timing provided by regulating both the build-up of pressure in and the bleed-off of pressure from those chambers. These figures should be considered along with the following description. First note that in FIGURE 14, the base line of the chart represents time, and the vertical dimension represents pressure.

The chart of FIGURE 15 taken with FIGURE 14 indicates the points in the overall cycle at which the exhaust valve 133 and the check valve 127 open and close. The letters A, B, C and D at the left of FIGURE 15 correspond to the same letters as applied to different portions of the cycle at the top of FIGURE 14, and the letters C and O as appearing in the columns headed "Valve 127" and "Valve 133," represent the "closed" and "open" conditions of the valves 127 and 133.

Before considering the following specific analysis of the sequence of operations, it is here further noted that in effect the valve 127 is a check valve with a delayed action. It is here further noted that the chamber 116 which, in effect, is an extension or enlargement of the volume of chamber 123 (because of the constantly open passage 136) serves as a reservoir for an appreciable quantity of air under pressure thereby providing for uniformity of action especially in the inspiratory phase, which is timed by bleed-off of pressure through the restriction of valve 141 from the chamber 123 (and thus also from chamber 125) to the chamber 134 and out of the equipment past the exhaust valve 133. The valve 141 thus serves to time the inspiratory phase. The valve 138, on the other hand, which controls the rate of build-up of pressure in the chamber 125, controls the time of the expiratory pause.

In following through the sequence of operations described below, the following description takes as a starting point in the cycle the end of the inspiratory phase which is marked by the closure of the vent valve 133. Since just prior to this event, the chamber 134 has been connected to atmosphere, the pressure in the passage 111 and also in chamber 110 is substantially atmospheric. This is true notwithstanding the fact that passage 111 is connected with the supply line 39. The restriction 111a provides sufficient flow of air for purposes of control but prevents excessive dumping of air into the control system in the upper portions of the controller of FIGURE 9. Chambers 125, 123 and 116, because of the bleed-off of pressure therefrom through the passages 137, 136 and 140, are at a pressure intermediate the supply pressure (entering at 39) and atmospheric pressure.

At the time of closure of the vent valve 133, the pressure in chambers 125, 123 and 116 commences to build up. This is a rapid build-up to supply pressure in chambers 116 and 123, but is a gradual build-up in chamber 125, in which the pressure does not attain supply pressure. Specifically, chamber 116 receives air under pressure through port 117 and passage 112 from the supply passage 111, and the pressure from chamber 116 is communicated to chamber 123 through passage 136. Because of the fact that the diaphragm 119 has a larger effective area in chamber 116 than the diaphragm 120 in chamber 123, the valve 127 will, after some build-up of pressure in chamber 116, close the port 124 communicating with chamber 125. Pressure however may build up further in chamber 125 through the passage 137 in a controlled or delayed manner according to the adjustment of the valve 138, and the pressure build-up in chamber 125 ultimately results in raising the diaphragm 126 and thus raising the central guide or fitting carried by diaphragms 126 and 129. This action occurs because of the greater effective area of diaphragm 126 presented downwardly to the chamber 125, as compared with the effective area of diaphragm 129 presented upwardly to the chamber 134. This upward movement of the fitting 131 causes the upper edge of the fitting to engage the exhaust valve 133 and lift it from its seat, whereupon the pressure in chamber 134 and in the communicating passage 111 is dissipated.

At this time the lowered pressure in chamber 110 results in lifting of the valve 100 by the spring 101 and reestablishment of flow from the supply pipe 39 to the bellows chamber so as to commence the inspiratory action of the equipment. The valve 133 remains open for an interval determined by the adjustment of valve 141 in passage 140. Passage 140 serves to bleed-off pressure from chamber 123. During the initial portion of this bleed-off of pressure the valve 127 is closed because of the larger effective area of diaphragm 119 in chamber 116 as compared with the effective area of diaphragm 120 in chamber 123, but as the pressure is dissipated through the passage 140, the pressure in chamber 116 is brought down because of communication of that chamber through passage 136 with the chamber 123, and at an intermediate point in the inspiratory phase, the valve 127 opens and establishes flow from chamber 125 through the port 124, whereupon the pressure in chamber 125 equalizes with that in chamber 123 and continues to drop at a rate determined by the setting of the valve 141. When the pressure in chamber 125 again approaches its lower limit the diaphragms 126 and 129 again drop down thereby providing for closure of the valve 133 and thus initiating the next expiratory phase in the cycle of operation.

In accordance with the modification shown in FIGURE 9a the connection 137 which is controlled by valve 138 may be provided with a check valve 144 preventing flow from chamber 125 to chamber 123, in which event the action of the valve 127 would be relied upon to determine the time of the inspiratory phase, and in that event the setting of valve 138 would have no influence on the inspiratory phase.

Attention is now called to the fact that the patient responsive device 67 is connected through pipe 66 with the passage 111. The exhaust valve 94 of the device 67 is thus placed in parallel with the exhaust valve 133 of the controller shown in FIGURE 9, and the opening of either of these exhaust valves will of course initiate the inspiratory phase of the operation. Therefore when the patient responsive device 67 is in use, inspiratory effort by the patient will immediately and quickly trigger the mechanism to initiate inspiratory action by the equipment. Because of the arrangement and operation of the controller as described above, and particularly because of the positive timing action of the inspiratory phase (by means of valve 141 and the controlled bleed-off of pressure from chambers 125, 123 and 116), inspiratory effort on the part of the patient will cause an inspiratory action; and the time or extent of that action will be essentially independent of the point in the expiratory pause at which the patient's inspiratory effort occurs. This will be clear from FIGURE 14 which not only shows the curve P-125 of the pressure in chamber 125, but also shows the pressure in chambers 116 and 123. From FIGURE 14 it will be seen that the time of inspiration is not appreciably affected even if the patient (by tripping the device 67) interrupts the build-up of pressure in chamber 125 at any point during the expiratory pause after the pressure in chambers 116 and 123 has approximately reached the supply pressure. Since the chambers 116 and 123 very quickly build up to supply pressure at the beginning of the expiratory pause and since this time is the time when the patient would be actively exhaling, for practical purposes the time of inspiration will be constant. The rapidity of build up of pressure in chambers 116 and 123 depends upon the volume of those chambers, the supply pressure and the size of orifice 111a.

The initial rapid build-up of pressure in chamber 125 to provide adequate pressure to open valve 133 when the patient initiates an inspiration is assured by the delayed closing action of the valve 127.

The sensitivity of the patient responsive device 67 is adjustable by means of the knob 96 and in view of the arrangement and integration of this device into the controller or timing mechanism, and further in view of the arrangement of the pneumatic operating connection 68 to communicate with the patient's breathing system on the patient's side of the check valves 30 and 31, it is possible to adjust the sensitivity to respond to very much weaker inspiratory efforts on the part of the patient than has been practicable heretofore.

I claim:

1. Lung ventilating equipment comprising a system adapted to be associated with a patient's lungs for handling the patient's inspiratory and expiratory gases and including a bellows for receiving such gases, means providing for collapse of the bellows to cause gas to be delivered to the patient including a chamber surrounding the bellows, a manually operable collapsible bag for controllably delivering gas under pressure to said chamber, mechanism automatically operated by a timing device for controllably delivering gas under pressure from a source thereof to said chamber and including a valved passage for controllably connecting said chamber to atmosphere, a valved gas overflow for discharging excess gases from said system into said passage for ultimate discharge to atmosphere when the passage valve is open, and valve means for alternatively connecting said bag and said mechanism with said chamber, the valve means including valve parts and portage providing for connecting said valved passage to said chamber when the automatically operated mechanism is connected to said chamber and further providing for blocking said valved passage from said chamber and for communication of said gas overflow with atmosphere when the bag is connected to said chamber.

2. Lung ventilating equipment comprising a system adapted to be associated with a patient's lungs for handling the patient's inspiratory and expiratory gases and including a bellows for receiving such gases, means providing for collapse of the bellows to cause gases to be delivered to the patient including a chamber surrounding the bellows, a duct connected with said chamber and having ports for supply thereto of gas from a supply source under pressure and for exhaust of gas therefrom to atmosphere, valves for control of the supply and exhaust ports, a valved gas overflow for discharging excess gas from said system into said duct for ultimate discharge to atmosphere when the exhaust port valve is open, another exhaust port from said duct to atmosphere, a safety valve for said last port, and a control device for holding the safety valve closed, said control device providing for release of the safety valve upon failure or shut-off of the supply source of gas under pressure.

3. Lung ventilating equipment comprising a system adapted to be associated with a patient's lungs for handling the patient's inspiratory and expiratory gases and including a bellows for receiving such gases, means providing for collapse of the bellows to cause gases to be delivered to the patient including a chamber surrounding the bellows, mechanism for effecting operation of the bellows including a duct communicating with said chamber, and an overflow valve structure for discharging excess gases from the interior of the bellows into said duct, the valve structure comprising a valve seat having an overflow port therein and a cooperating diaphragm valve having pressure responsive area around said seat exposed to the pressure in the bellows and a pressure chamber within the bellows at the opposite side of the diaphragm valve and having communication with the chamber space, the diaphragm valve having greater surface area exposed to the interior of said pressure chamber than the area of the diaphragm valve exposed to the overflow port within said valve seat.

4. Lung ventilating equipment comprising a patient's breathing circuit including a collapsible reservoir for inspiratory gases, fluid pressure operated power means for effecting collapse of the reservoir to deliver gases therefrom to the patient, mechanism for operating the power means including valve means for supply of operating fluid thereto and for discharge of operating fluid therefrom, and a control system for said valve means including a timing mechanism comprising means operative independently of the pressure in the patient's breathing circuit establishing a timed cycle of operation according to which the valve means provides alternately for supply and discharge of operating fluid, and separate means for respectively and substantially independently adjusting the duration of fluid supply and fluid discharge provided by the valve means, thereby providing for substantially independent adjustment of the inspiratory action and expiratory pause of the equipment.

5. Equipment according to claim 4 and further including a device responsive to inspiratory effort by the patient to initiate inspiratory action by the equipment, said device being connected with the control system for the valve means and being operative at any point in the expiratory pause of the equipment.

6. Lung ventilating equipment comprising a patient's breathing circuit including a collapsible reservoir for inspiratory gases, fluid pressure operated power means for effecting collapse of the reservoir to deliver gases therefrom to the patient, mechanism for operating the power means including valve means openable to provide for supply of operating fluid to the power means and closeable to shut off the supply of operating fluid and to provide for discharge of operating fluid from the power means, and a control system for said valve means including a fluid pressure control device operative upon increase of pressure therein to close the valve means and upon decrease of pressure to open the valve means, an exhaust valve openable to discharge pressure from said control device and closeable to provide for build up of pressure in the control device, and timing means operative independently of the pressure in the patient's breathing circuit for effecting opening and closing of said exhaust valve including an actuating element and an associated pressure control chamber for operating the actuating element, means providing for timed build-up of pressure in the control chamber and for timed bleed-off of pressure from the control chamber, and means for separately adjusting the rate of pressure build-up in and pressure bleed-off from said control chamber.

7. Equipment according to claim 6 and further including a device responsive to inspiratory effort by the patient to exhaust pressure from said control chamber.

8. In lung ventilating equipment of the kind including a patient's airway having a collapsible reservoir for inspiratory and expiratory gases and a cooperating chamber for receiving gas under pressure to effect collapse of the reservoir and thereby deliver inspiratory gas to the patient, an exhaust valve for said chamber for discharging gas therefrom during expiration of gas from the patient, a fluid pressure device for operating the exhaust valve, fluid pressure supply means including a timer and a pressure line for delivering pressure fluid to said device, a fluid pressure operated venturi for developing a negative pressure in said chamber to assist expiration by the patient, and a pressure fluid supply line connected with said first pressure line and delivering operating fluid to the venturi.

9. Equipment according to claim 8 and further including a shut-off valve for the pressure line for delivering operating fluid to the venturi, said shut-off valve being located beyond the point of connection of the venturi line with the line for delivering fluid pressure to the operating device for the exhaust valve, to thereby provide for alternative operation of the expiratory phase either with or without pressure reduction induced by the venturi.

10. Lung ventilating equipment comprising a patient's breathing circuit including a collapsible reservoir for receiving expiratory gases from the patient during the expiratory phase of the patient's breathing and for delivering inspiratory gases to the patient during the inspiratory phase of the patient's breathing, fluid pressure operated power means for effecting collapse of the reservoir to deliver gases therefrom to the patient, mechanism for operating the power means including valve means for supply of operating fluid thereto and for discharge of operating fluid therefrom, automatic timing means operating independently of the pressure in the patient's breathing circuit for cycling the operation of the valve means to alternately operate the valve means to supply operating fluid and thus establish inspiration by the patient and to discharge operating fluid and thus to establish an expiratory pause, and a control system including separate means for respectively and substantially independently adjusting the duration of fluid supply and fluid discharge provided by the valve means, thereby providing for substantially independent adjustment of the inspiratory action and expiratory pause of the equipment as provided by the automatic timing means, the control system further including a device responsive to inspiratory effort by the patient to operate the supply valve means to initiate inspiratory action by the equipment, and means for establishing a period of inspiratory action as initiated by the patient not appreciably shorter than that provided by the adjusting means, regardless of the point in the expiratory phase at which the inspiratory effort by the patient is manifested.

References Cited by the Examiner
UNITED STATES PATENTS

| 2,880,719 | 4/1959 | Andreasen | 128—29 |
| 3,045,668 | 7/1962 | Lee | 128—29 |
| 3,046,979 | 7/1962 | Andreasen | 128—29 |
| 3,114,365 | 12/1963 | Franz | 128—29 |
| 3,156,238 | 11/1964 | Bird et al. | 128—29 |

RICHARD A. GAUDET, *Primary Examiner.*

C. F. ROSENBAUM, *Assistant Examiner.*